United States Patent
Cowburn et al.

(10) Patent No.: US 11,488,368 B2
(45) Date of Patent: *Nov. 1, 2022

(54) CROWD SOURCED MAPPING SYSTEM

(71) Applicant: Snap Inc., Santa Monica, CA (US)

(72) Inventors: Piers Cowburn, London (GB); Isac Andreas Müller Sandvik, London (GB); Qi Pan, London (GB); David Li, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/329,435

(22) Filed: May 25, 2021

(65) Prior Publication Data

US 2021/0279969 A1  Sep. 9, 2021

Related U.S. Application Data

(63) Continuation of application No. 16/447,591, filed on Jun. 20, 2019, now Pat. No. 11,087,543.

(51) Int. Cl.
| | |
|---|---|
| *G06T 19/00* | (2011.01) |
| *G06T 7/00* | (2017.01) |
| *G06T 19/20* | (2011.01) |
| *G06F 16/51* | (2019.01) |
| *G06F 16/54* | (2019.01) |
| *H04L 51/224* | (2022.01) |

(Continued)

(52) U.S. Cl.
CPC ............ *G06T 19/006* (2013.01); *G06F 16/51* (2019.01); *G06F 16/54* (2019.01); *G06T 7/97* (2017.01); *G06T 19/20* (2013.01); *H04L 51/224* (2022.05); *H04L 67/51* (2022.05); *G06T 2219/024* (2013.01); *H04L 67/01* (2022.05)

(58) Field of Classification Search
CPC ......... G06T 19/006; G06T 7/97; G06T 19/20; G06T 2219/024; G06F 16/51; G06F 16/54; H04L 51/24; H04L 67/16; H04L 67/42
See application file for complete search history.

(56) References Cited

U.S. PATENT DOCUMENTS 9,036,898 B1 *  5/2015  Beeler ................. G06T 17/00
                                             382/154
10,495,476 B1 * 12/2019  Yu .................... G01C 21/3415
(Continued)

OTHER PUBLICATIONS

"U.S. Appl. No. 16/447,591, Final Office Action dated Sep. 21, 2020", 14 pgs.

(Continued)

*Primary Examiner* — Abderrahim Merouan
(74) *Attorney, Agent, or Firm* — Schwegman Lundberg & Woessner, P.A.

(57) ABSTRACT

A crowd-sourced modeling system to perform operations that include: receiving image data that comprises image attributes; accessing a 3D model based on at least the image attributes of the image data, wherein the 3D model comprises a plurality of parts that collectively depict an object or environment; identifying a change in the object or environment based on a comparison of the image data with the plurality of parts of the 3D model, the change corresponding to a part of the 3D model from among the plurality of parts; and generating an update to the part of the 3D model based on the image attributes of the image data.

17 Claims, 12 Drawing Sheets

(51) Int. Cl.
*H04L 67/51* (2022.01)
*H04L 67/01* (2022.01)

(56) References Cited

U.S. PATENT DOCUMENTS

| | | | |
|---|---|---|---|
| 10,769,437 B2 | 9/2020 | Mukherjee et al. | |
| 11,087,543 B1 | 8/2021 | Cowburn et al. | |
| 2012/0226437 A1* | 9/2012 | Li | G01C 21/3647 701/423 |
| 2013/0194110 A1* | 8/2013 | Kim | G06V 20/20 340/905 |
| 2013/0321257 A1 | 12/2013 | Moore et al. | |
| 2013/0321398 A1* | 12/2013 | Howard | G06T 19/20 345/419 |
| 2014/0201126 A1 | 7/2014 | Zadeh et al. | |
| 2014/0369595 A1* | 12/2014 | Pavlidis | G06T 17/05 382/154 |
| 2015/0204687 A1* | 7/2015 | Yoon | G01C 21/3647 701/436 |
| 2019/0035143 A1 | 1/2019 | Pavlidis et al. | |
| 2019/0094554 A1* | 3/2019 | Benesh | G06T 11/001 |
| 2019/0311199 A1 | 10/2019 | Mukherjee et al. | |
| 2019/0392635 A1* | 12/2019 | Ma | G01C 21/367 |
| 2020/0025935 A1* | 1/2020 | Liang | G06N 3/08 |
| 2020/0027265 A1 | 1/2020 | Levy et al. | |
| 2020/0149916 A1* | 5/2020 | Yu | G01C 21/3691 |
| 2020/0186731 A1* | 6/2020 | Chen | G02B 27/0176 |
| 2020/0192352 A1* | 6/2020 | Rastoll | G06V 20/58 |

OTHER PUBLICATIONS

"U.S. Appl. No. 16/447,591, Non Final Office Action dated Apr. 1, 2020", 12 pgs.

"U.S. Appl. No. 16/447,591, Non Final Office Action dated Dec. 23, 2020", 15 pgs.

"U.S. Appl. No. 16/447,591, Notice of Allowance dated Mar. 31, 2021", 9 pgs.

"U.S. Appl. No. 16/447,591, Response filed Mar. 23, 2021 to Non Final Office Action dated Dec. 23, 2020", 11 pgs.

"U.S. Appl. No. 16/447,591, Response filed Jun. 30, 2020 to Non Final Office Action dated Apr. 1, 2020", 12 pgs.

"U.S. Appl. No. 16/447,591, Response filed Nov. 23, 2020 to Final Office Action dated Sep. 21, 2020", 11 pgs.

* cited by examiner

400 

```
RECEIVING IMAGE DATA THAT COMPRISES IMAGE ATTRIBUTES
402
```

```
ACCESSING A 3D MODEL BASED ON AT LEAST THE IMAGE ATTRIBUTES OF
THE IMAGE DATA, THE 3D MODEL COMPRISING A PLURALITY OF PARTS
THAT COLLECTIVELY DEPICT AN ENVIRONMENT
404
```

```
DETECTING A CHANGE IN THE ENVIRONMENT BASED ON A COMPARISON
OF THE IMAGE DATA WITH THE PLURALITY OF PARTS OF THE 3D MODEL,
THE CHANGE CORRESPONDING TO A PART OF THE 3D MODEL FROM
AMONG THE PLURALITY OF PARTS
406
```

```
GENERATING AN UPDATE TO THE PART OF THE 3D MODEL BASED ON AT
LEAST THE IMAGE ATTRIBUTES OF THE IMAGE DATA
408
```

```
┌─────────────────────────────────────────────────────────────┐
│ ACCESSING SECOND IMAGE DATA IN RESPONSE TO DETECTING THE    │
│ CHANGE IN THE ENVIRONMENT, THE SECOND IMAGE DATA DEPICTING A│
│ PORTION OF THE ENVIRONMENT THAT CORRESPONDS WITH THE PART   │
│                     OF THE 3D MODEL                         │
│                          502                                │
└─────────────────────────────────────────────────────────────┘
                              │
                              ▼
┌─────────────────────────────────────────────────────────────┐
│ GENERATING THE UPDATE TO THE PART OF THE 3D MODEL BASED ON AT│
│              LEAST THE SECOND IMAGE DATA                    │
│                          504                                │
└─────────────────────────────────────────────────────────────┘
```

ACCESSING A REPOSITORY THAT COMPRISES A COLLECTION OF IMAGE DATA ASSOCIATED WITH THE LOCATION, THE COLLECTION OF IMAGE DATA INCLUDING AT LEAST THE SECOND IMAGE DATA
602

GENERATING THE UPDATE TO THE PART OF THE 3D MODEL BASED ON THE COLLECTION OF IMAGE DATA
604

*FIG. 6*

700 

```
┌─────────────────────────────────────────────────────────────┐
│ DETECTING A CLIENT DEVICE IN RESPONSE TO THE DETECTING THE  │
│              CHANGE IN THE ENVIRONMENT                       │
│                         702                                  │
└─────────────────────────────────────────────────────────────┘
                              │
                              ▼
┌─────────────────────────────────────────────────────────────┐
│   CAUSING DISPLAY OF A NOTIFICATION AT THE CLIENT DEVICE, THE│
│ CLIENT DEVICE INCLUDING AN IDENTIFICATION OF THE LOCATION OF THE│
│        ENVIRONMENT ASSOCIATED WITH THE 3D MODEL              │
│                         704                                  │
└─────────────────────────────────────────────────────────────┘
                              │
                              ▼
┌─────────────────────────────────────────────────────────────┐
│        ACCESSING SECOND IMAGE DATA AT THE CLIENT DEVICE      │
│                         706                                  │
└─────────────────────────────────────────────────────────────┘
                              │
                              ▼
┌─────────────────────────────────────────────────────────────┐
│ GENERATING THE UPDATE TO THE PART OF THE 3D MODEL BASED ON   │
│       THE SECOND IMAGE DATA FROM THE CLIENT DEVICE           │
│                         708                                  │
└─────────────────────────────────────────────────────────────┘
```

*FIG. 7*

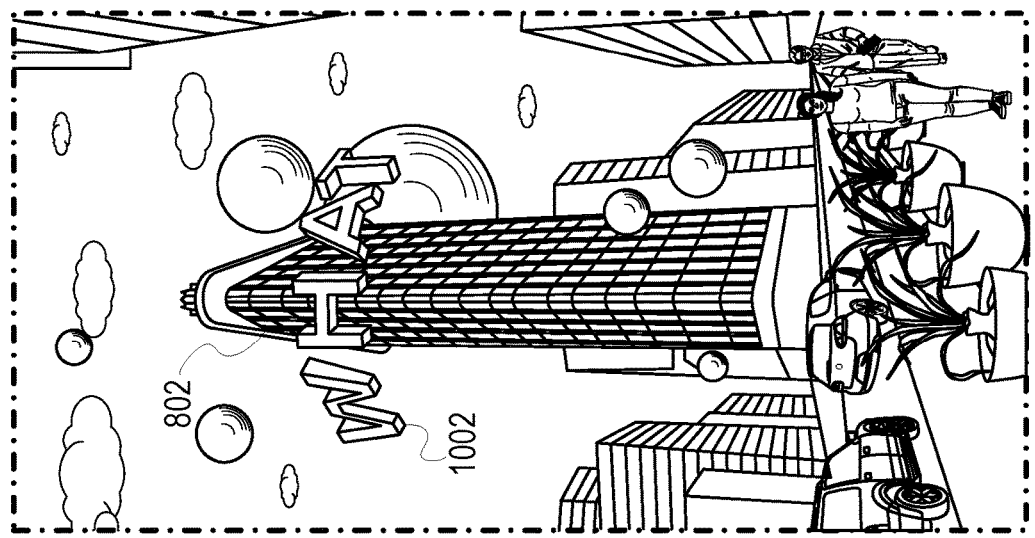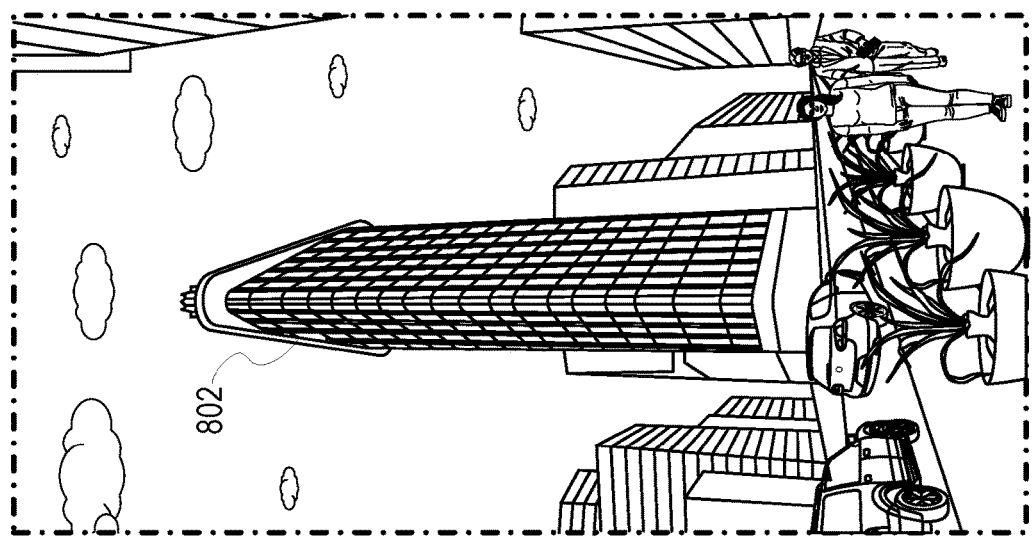
FIG. 10

CROWD SOURCED MAPPING SYSTEM

PRIORITY CLAIM

This application is a continuation of and claims the benefit of priority of U.S. patent application Ser. No. 16/447,591, filed Jun. 20, 2019, which is herein incorporated by reference in its entirety.

TECHNICAL FIELD

Embodiments of the present disclosure relate generally to three-dimensional (3D) modeling, and more particularly, to systems for generating 3D models.

BACKGROUND

Augmented reality (AR) is an interactive experience of a real-world environment where the objects that reside in the real-world environment are enhanced by computer-generated perceptual information, sometimes across multiple sensory modalities. The overlaid sensory information (i.e., media content) can be constructive (i.e., additive to the natural environment) or destructive (i.e., masking of the natural environment) and is seamlessly interwoven with the physical world such that it is perceived as an immersive aspect of the real-world environment. Accordingly, in order to accurately and seamlessly present the overlaid sensory information within a presentation of the real-world environment, AR systems may employ 3D models of the real-world environment.

In computer graphics, 3D modeling is the process of developing a mathematical representation of a surface of an object or environment in three dimensions. Typically, 3D models depicting objects and environments are generated using voluminous reference data depicting those objects and environments. As a result, one aspect of 3D modelling may be the method and type of reference data that is collected. For example, to generate a 3D model depicting a real-world object, existing techniques may necessitate the production of image data useable to generate the 3D model.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart illustrating a method for crowd-sourcing updates to a 3D model, according to certain example embodiments.

FIG. 5 is a flowchart illustrating a method for crowd-sourcing updates to a 3D model, according to certain example embodiments.

FIG. 6 is a flowchart illustrating a method for crowd-sourcing updates to a 3D model, according to certain example embodiments.

FIG. 7 is a flowchart illustrating a method for crowd-sourcing updates to a 3D model, according to certain example embodiments.

FIG. 10 is an interface diagram depicting augmented reality content presented at a client device to incentivize a user to capture and record images of an object responsive to detecting a change in the object, according to certain example embodiments.

DETAILED DESCRIPTION

Figure 1:
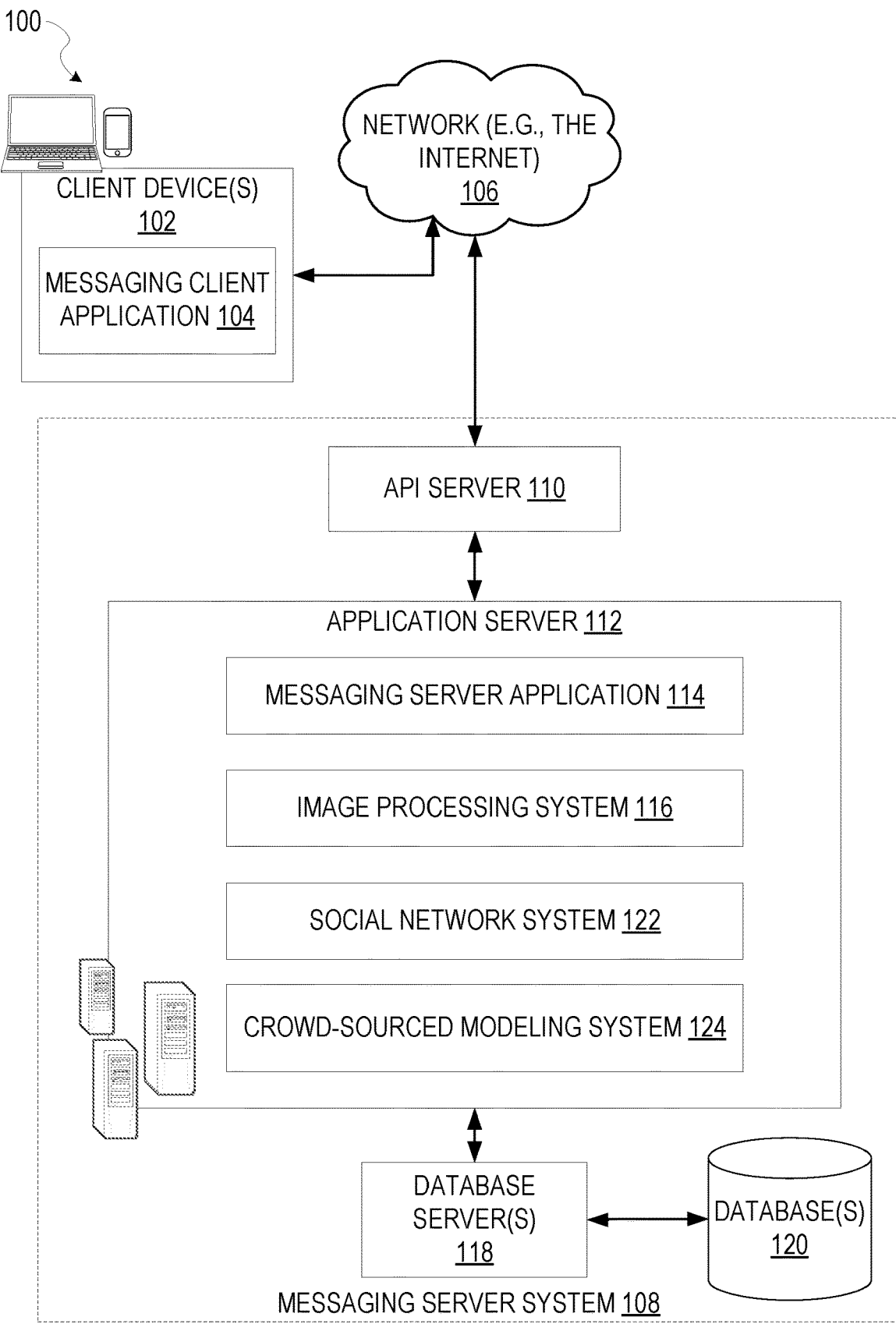
FIG. 1 is a block diagram showing an example messaging system for exchanging data (e.g., messages and associated content) over a network in accordance with some embodiments, wherein the messaging system includes a crowd-sourced modeling system.

As discussed above, 3D modelling includes the process of developing a mathematical representation of a surface based on reference data that may include image data. For example, a 3D modelling system may access an image repository that comprises a collection if images depicting an object or environment and generate a 3D model of the object or environment based on the collection of images. Accordingly, the 3D model can be associated with a set of coordinates in order to improve the accuracy and realism of AR content overlaid upon a presentation of a real-world location of the object or environment.

As an illustrative example, a 3D model of a structure at a real-world location can be associated with a set of coordinates, such that AR content presented at devices may more seamlessly and realistically interact with the environment based on the 3D model of the structure. Accordingly, example embodiments described herein therefore relate to systems and methods for crowd sourcing reference data (i.e., images and videos) to generate and update location specific 3D models.

A crowd-sourced modeling system performs operations that include:

receiving image data that comprises image attributes; accessing a 3D model based on at least the image attributes of the image data, wherein the 3D model comprises a plurality of parts that collectively depict an object or environment; identifying a change in the object or environment based on a comparison of the image data with the plurality of parts of the 3D model, the change corresponding to a part of the 3D model from among the plurality of parts; and generating an update to the part of the 3D model based on the image attributes of the image data.

Generating the update to the part of the 3D model may include accessing a repository that comprises a collection of image data associated with the object or environment depicted by the 3D model. For example, the crowd-sourced modeling system may collect image data from a plurality of devices, wherein the image data comprises image metadata that includes temporal data (timestamps), and location data (such as coordinates). Responsive to detecting a change in the object or environment based on the image data, the crowd-sourced modeling system accesses the repository to retrieve image data based on the location of the object or environment. According to certain embodiments, the image data retrieved from the repository may also be based on the timestamps, such that the "most recent," and therefore most accurate, image data can be retrieved to generate up-to-date updates to the 3D model.

In some example embodiments, the crowd-sourced modeling system may collect images of an object or real-world environment by incentivizing or otherwise guiding users of a plurality of client devices to a location that corresponds to a 3D model, responsive to detecting a change in a 3D model at the location. For example, responsive to detecting a change in an environment, the crowd-sourced modeling system may identify a plurality of devices within a threshold distance of the location of a 3D model, and present AR content to incentivize users of the plurality of devices to go to the location of the 3D model.

Consider an illustrative example from a user perspective. A user of a client device may access and display AR content within an interface configured to display AR content at the client device. For example, the interface may present image data captured by a camera associated with the client device, wherein the image data depicts a real-world environment (i.e., a street, a room, etc.). To present the AR content within the interface, the crowd-sourced modeling system may access one or more 3D models depicting objects and surfaces of the real-world environment. For example, the 3D models may be associated with the real-world location based on geo-location coordinates or based on image recognition techniques applied to the image data presented within the interface at the client device.

Responsive to accessing the 3D models depicting objects and surfaces of the real-world environment, the crowd-sourced modeling system identifies a change in the real-world environment based on a comparison of the image data that depicts the real-world environment, with the 3D models depicting the objects and surfaces of the real-world environment. For example, a new structure or object may have been placed in the real-world environment, and as a result, the 3D models may no longer accurately depict the objects or surfaces of the real-world environment.

Based on the determination that the real-world environment has changed, and as a result the 3D models are no longer accurate, the crowd-sourced modeling system identifies one or more devices within a threshold distance of the real-world environment, and presents a notification at the one or more devices to incentivize the one or more devices to go to the real-world location. For example, in some embodiments the notification may include AR content to guide a user of a client device to the real-world location.

Responsive to detecting a client device at the real-world location, the crowd-sourced modeling system may request that a user of a client device capture images of a portion of the real-world location that corresponds with the change. For example, the crowd-sourced modeling system may cause display of an interface that indicate areas in the real-world location that have changed. Responsive to receiving images from the plurality of client devices, the crowd-sourced modeling system generates an update to the effected 3D models, therefore enabling the system to more realistically present the AR content within the interface.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a crowd-sourced modeling system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories, galleries, or collections). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
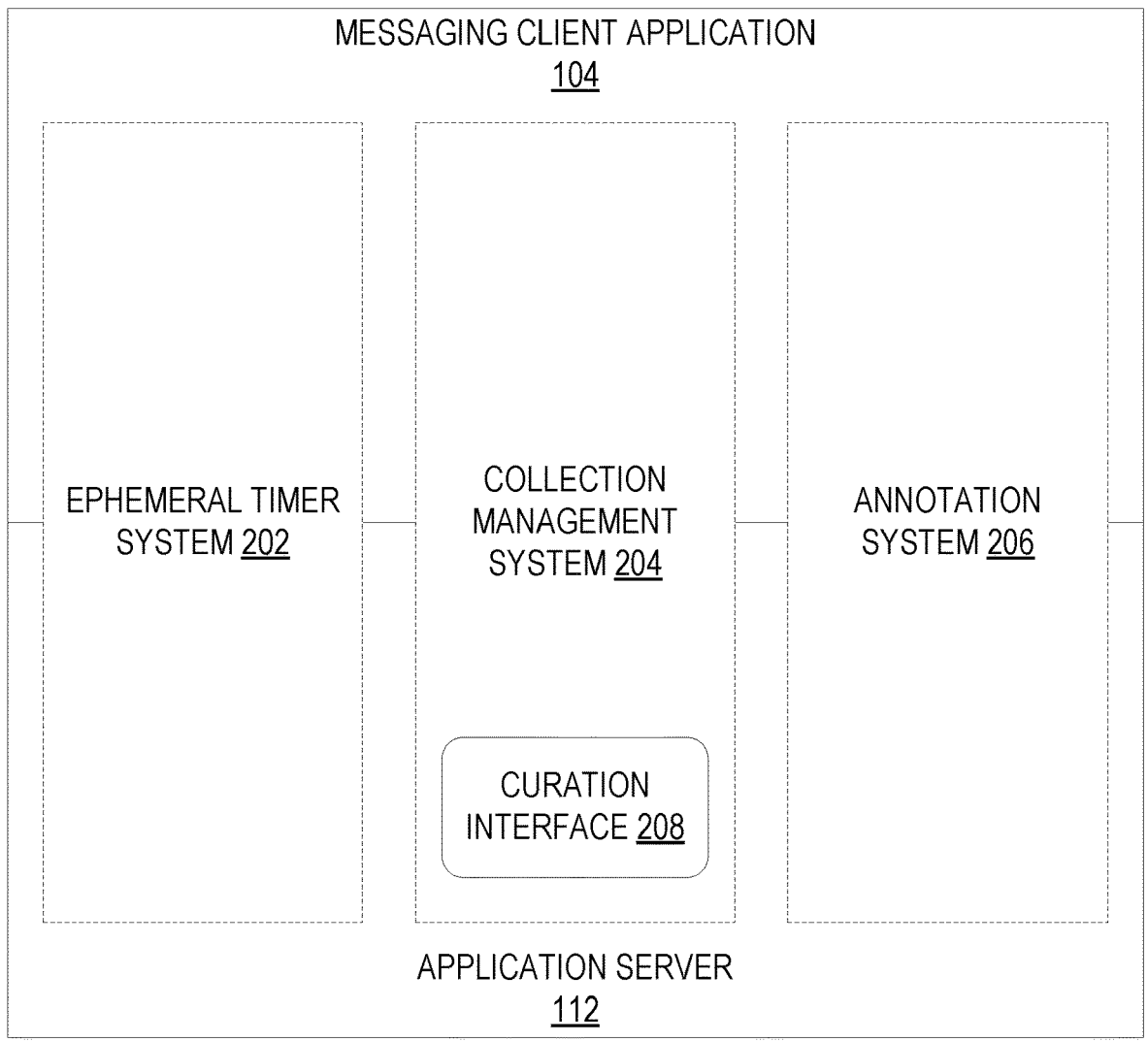
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages, or graphical element, selectively display and enable access to messages and associated content via the messaging client application 104. Further details regarding the operation of the ephemeral timer system 202 are provided below.

The collection management system 204 is responsible for managing collections of media (e.g., a media collection that includes collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content, such as user support content received by the user to be forwarded or redistributed to one or more recipients. For example, the annotation system 206 provides functions related to the generation and publishing of media overlays for messages processed by the messaging system 100. The annotation system 206 operatively supplies a media overlay to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects, as well as augmented reality overlays. Examples of audio and visual content include pictures, texts, logos, animations, and sound effects, as well as animated facial models, image filters, and augmented reality media content. An example of a visual effect includes color overlaying. The audio and visual content or the visual effects can be applied to a media content item (e.g., a photo or video or live stream) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
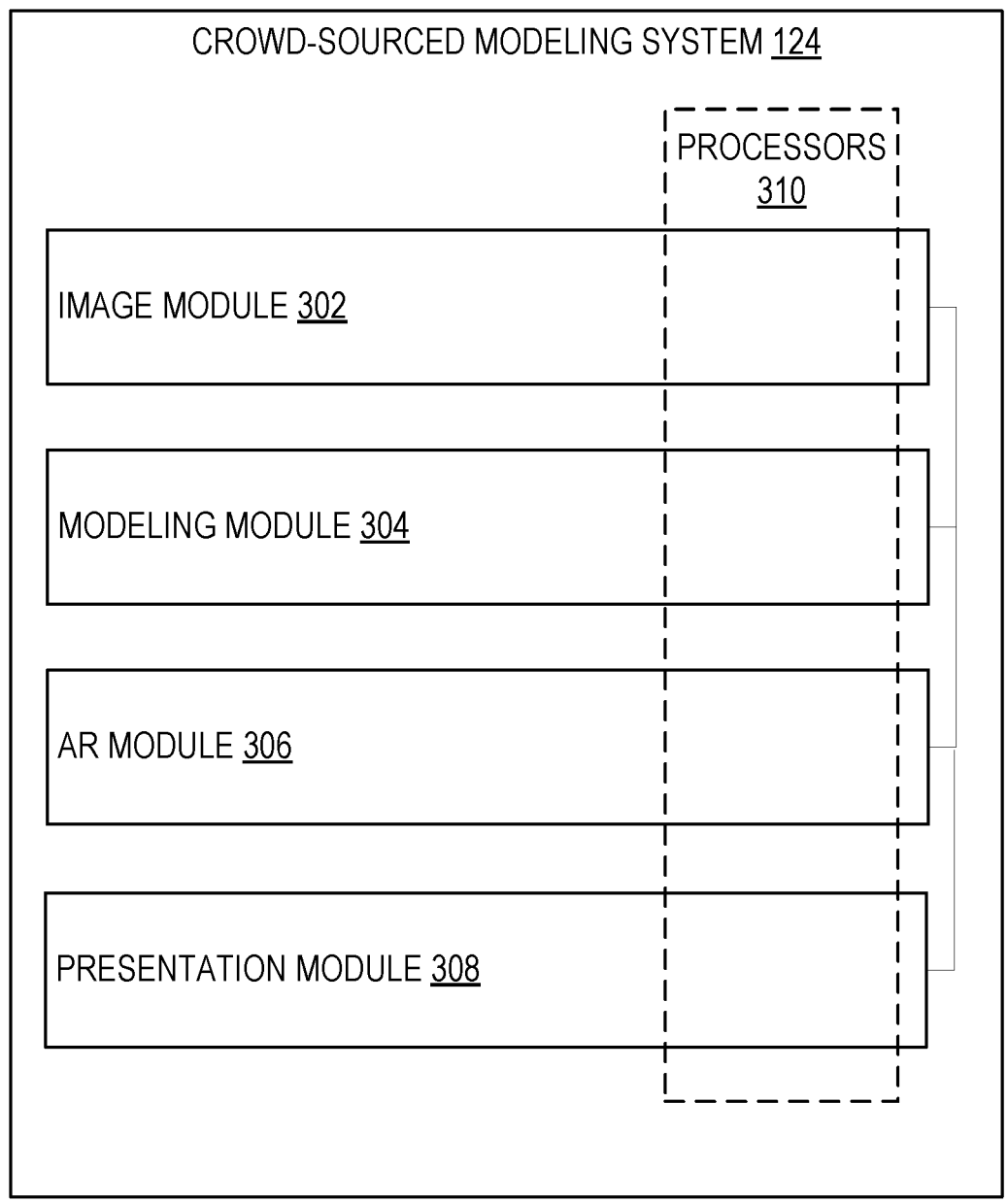
FIG. 3 is a block diagram illustrating various modules of a crowd-sourced modeling system, according to certain example embodiments.

In another example embodiment, the annotation system 206 provides a merchant-based publication platform that enables merchants to select a particular media overlay associated with a geolocation. For example, the annotation system 206 associates the media overlay of a highest bidding merchant with a corresponding geolocation for a predefined amount of time FIG. 3 is a block diagram illustrating components of the crowd-sourced modeling system 124 that configure the crowd-sourced modeling system 124 to perform operations that include: receiving image data that comprises image attributes; accessing a 3D model based on at least the image attributes of the image data, wherein the 3D model comprises a plurality of parts that collectively depict an object or environment; identifying a change in the object or environment based on a comparison of the image data with the plurality of parts of the 3D model, the change corresponding to a part of the 3D model from among the plurality of parts; and generating an update to the part of the 3D model based on the image attributes of the image data, according to certain example embodiments.

The crowd-sourced modeling system 124 is shown as including an image module 302, a modeling module 304, an AR module 306, and a presentation module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the crowd-sourced modeling system 124 may physically include an arrangement of one or more of the processors 310 (e.g., a subset of or among the one or more processors of the machine) configured to perform the operations described herein for that module. As another example, any module of the crowd-sourced modeling system 124 may include software, hardware, or both, that configure an arrangement of one or more processors 310 (e.g., among the one or more processors of the machine) to perform the operations described herein for that module. Accordingly, different modules of the crowd-sourced modeling system 124 may include and configure different arrangements of such processors 310 or a single arrangement of such processors 310 at different points in time. Moreover, any two or more modules of the crowd-sourced modeling system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 4 is a flowchart illustrating a method 400 for crowd-sourcing updates to a 3D model, according to certain example embodiments. Operations of the method 400 may be performed by the modules described above with respect to FIG. 3. As shown in FIG. 4, the method 400 includes one or more operations 402, 404, 406, and 408.

At operation 402, the image module 302 receives image data that comprises image attributes. The image module 302 may receive the image data depicting a real-world environment from a camera associated with the client device 102. For example, a user of the client device 102 may capture image data to be presented within a graphical user interface of the client device 102.

According to some example embodiments, the client device 102 may include one or more processors configured through a set of instructions to receive and display AR content within a presentation of image data that depicts a real-world environment. For example, the AR content may be overlaid within the presentation of the image data based on one or more 3D models accessed by the client device 102, wherein the 3D models depict objects and surfaces of the real-world environment.

At operation 404, responsive to the image module 302 receiving the image data that comprises the image attributes from the client device 102, the AR module 306 accesses a 3D model based on at least the image attributes of the image data, wherein the 3D model comprises a plurality of parts that collectively depict the environment depicted by the image data.

In some embodiments, the AR module 306 may access a repository that comprises a plurality of 3D models, and accesses one or more 3D models based on the image attributes of the image data. For example, the AR module 306 may apply one or more image recognition techniques to identify a location or object based on the image attributes, and then accesses a 3D model associated with the location or object. In some embodiments, the image data may include image metadata that includes location data. In such embodiments, the AR module 306 may access a 3D model associated with a location identified by the location data. The 3D model may include a 3D mesh that provides an indication of a surface of an object or environment.

In some embodiments, each 3D model may include an associated set of reference points to define a position and orientation in which the 3D model is to be positioned within a real-world environment. The reference points may for example be based on image data used to generate the 3D model. The AR module 306 may generate sets of reference points to be associated with vertices of the 3D model so that the 3D model can be repeatably and accurately applied to a real-world location.

At operation 406, the modeling module 304 detects a change in the environment based on a comparison of the image data with the 3D model. In some embodiments, the change may be based on a comparison of the image data with the set of reference points associated with the 3D model. For example, the change may indicate that an object or structure within the real-world location has changed in some way since the 3D model was initially created, and as a result, the 3D model is no longer an accurate representation of the real-world location.

At operation 408, responsive to the modeling module 304 detecting a change in the environment based on the image data, the modeling module 304 generates an update to a part of the 3D model based on at least the image attributes of the image data. In some embodiments, the AR module 306 may generate an updated set of reference points to define orientation and positioning of the updated 3D model, based on the image attributes of the image data.

FIG. 5 is a flowchart illustrating a method 500 for crowd-sourcing updates to a 3D model, according to certain example embodiments. Operations of the method 500 may be performed by the modules described above with respect to FIG. 3. As shown in FIG. 5, the method 500 includes one or more operations 502, and 504, that may be performed as a part of the method 400 depicted in FIG. 4. For example, the method 500 may be performed as a subroutine of operation 408 of the method 400 depicted in FIG. 4.

At operation 502, responsive to detecting a change in the environment based on a comparison of the image data with the 3D model associated with the location or object depicted by the image data, the image module 302 accesses second image data that depicts a portion of the object or environment that corresponds with the part of the 3D model. For example, the image module 302 may access an image repository, or a client device, such as the client device 102 in order to identify and retrieve the second image data based on location data or image attributes.

As an illustrative example, the image data and the 3D model may be associated with a set of image attributes or location data. The image module 302 may identify the second image data based on the image attributes or location data associated with the 3D model and the image data.

At operation 504, the modeling module 304 generates an update to a part of the 3D model effected by the change in the object or environment based on the second image data.

FIG. 6 is a flowchart illustrating a method 600 for crowd-sourcing updates to a 3D model, according to certain example embodiments. Operations of the method 600 may be performed by the modules described above with respect to FIG. 3. As shown in FIG. 6, the method 600 includes one or more operations 602, and 604, that may be performed as a part of the method 400 depicted in FIG. 4. For example, the method 600 may be performed as a subroutine of operation 408 of the method 400 depicted in FIG. 4.

At operation 602, responsive to detecting a change in the environment based on a comparison of the image data with the 3D model associated with the location or object depicted by the image data, the image module 302 accesses second image data that depicts a portion of the object or environment that corresponds with the part of the 3D model. For example, the image module 302 may access an image repository that comprises a collection of image data associated with the set of image attributes or location of the image data and the 3D model, wherein the collection of image data includes at least a second image data.

At operation 604, the modeling module 304 generates an update to a part of the 3D model effected by the change in the object or environment based on the plurality of image data including the second image data.

FIG. 7 is a flowchart illustrating a method 700 for crowd-sourcing updates to a 3D model, according to certain example embodiments. Operations of the method 700 may be performed by the modules described above with respect to FIG. 3. As shown in FIG. 7, the method 700 includes one or more operations 702, 704, 706, and 708, that may be performed as a part of the method 400 depicted in FIG. 4. For example, the method 600 may be performed as a subroutine of operation 408 of the method 400 depicted in FIG. 4.

At operation 702, responsive to detecting a change in the environment based on a comparison of the image data with the 3D model associated with the location or object depicted by the image data, the image module 302 detects one or more client devices within a threshold distance of the location associated with the 3D model.

Responsive to detecting the one or more client devices within the threshold distance of the location associated with the 3D model, at operation 704, the presentation module 308 causes display of a notification at the one or more devices, wherein the notification includes at least an identification of the location of the environment or object associated with the 3D model, or comprises a guidance interface to guide users of the one or more client devices to the location associated with the 3D model.

For example, in some embodiments, the notification may include AR content overlaid upon a presentation of image data at the one or more client devices, wherein the AR content guides users of the one or more client devices to the location associated with the 3D model. As an illustrative example, the AR content could include guidance information, or an incentivization to attract users of the one or more client devices to the location associated with the 3D model.

At operation 706, the image module 302 accesses image data at the one or more client devices. For example, in some embodiments, responsive to detecting the one or more client devices at the location associated with the 3D model, the AR module 306 may present AR content near and around the portion of the environment that corresponds with the change detected based on the comparison of the image data with the 3D model, in order to incentivize users to capture and display images of the location.

At operation 708, the modeling module 304 generates an update to a part of the 3D model based on the image data accessed from the one or more client devices.

Figure 8:
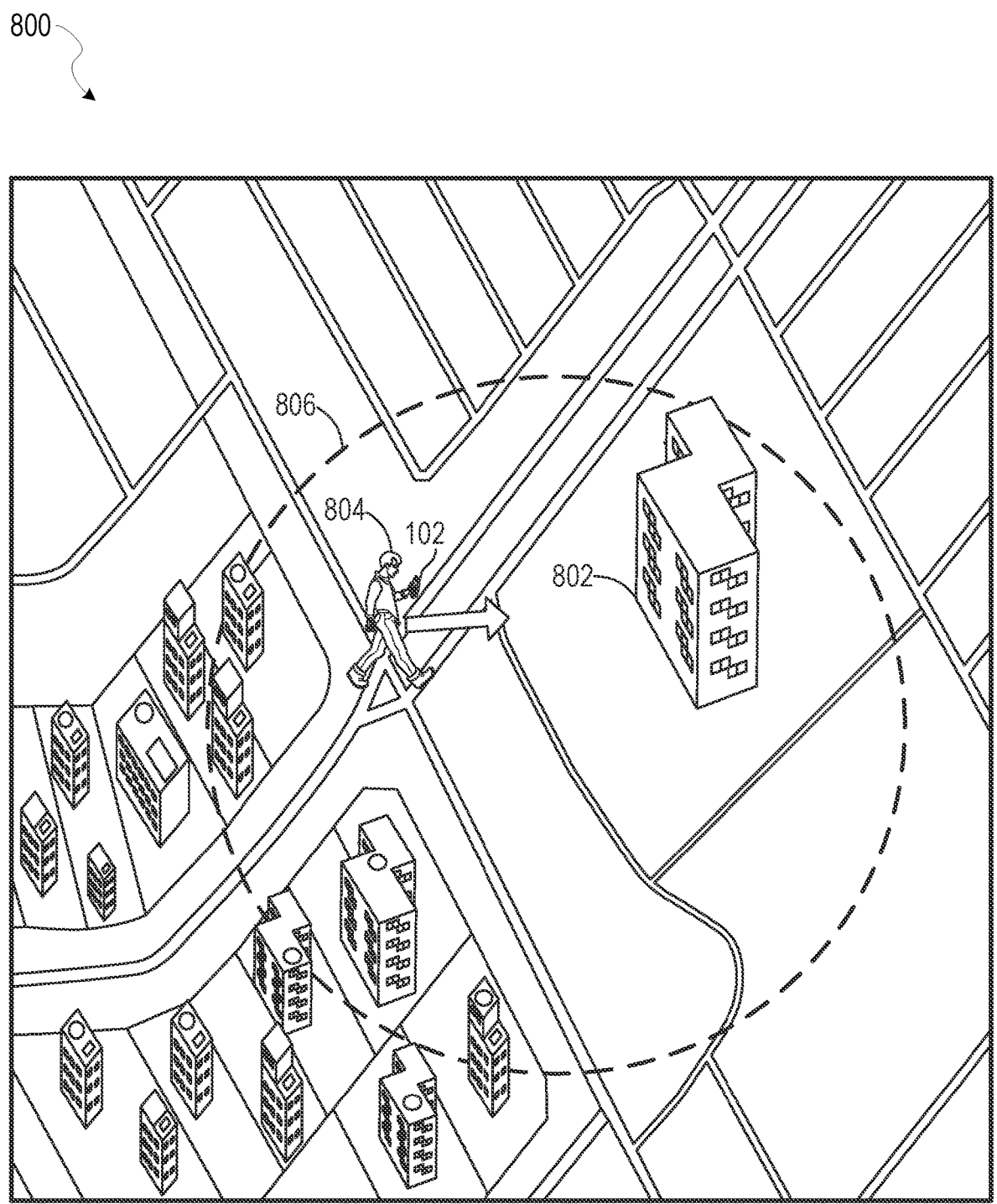
FIG. 8 is a diagram depicting an object at a location in an environment that corresponds with a 3D model, according to certain example embodiments.

FIG. 8 is a diagram 800 depicting an object 802 at a location in an environment that corresponds with a 3D model. As discussed in the method 700 depicted in FIG. 7, responsive to detecting a change in the object 802 based on a comparison of image data with a 3D model that depicts the object 802, the crowd-sourced modeling system 124 causes display of a notification at a client device 102 to guide the user 804 to the object 802. For example, the user 804 may be located within a threshold distance 806 from the object 802.

Figure 9:
FIG. 9 is an interface diagram depicting augmented-reality content presented at a client device, according to certain example embodiments.

FIG. 9 is an interface diagram 900 depicting AR content 905 that may be presented through a notification at a client device 102, to guide a user, such as the user 804 depicted in FIG. 8, to an object, such as the object 802, responsive to detecting a change in the object 802 based on a comparison of image data with a 3D model associated with the object 802.

In some embodiments, the AR content 905 may include a guidance interface that guides a user, such as the user 804, to a location that corresponds with a 3D model. For example, the guidance interface may direct the user 804 by presenting augmented-reality arrows or other content to lead the user to a location that corresponds with the 3D model.

FIG. 10 is an interface diagram 1000 depicting AR content 1002 that may be presented at a client device 102, to incentivize a user, such as the user 804 depicted in FIG. 8, to capture and record images of an object, such as the object 802, responsive to detecting a change in the object 802 based on a comparison of image data with a 3D model associated with the object 802.

For example, the crowd-sourced modeling system 124 may present the AR content 1002 at a position within a graphical user interface that corresponds with the change detected based on the comparison of the image data with the 3D model. As an illustrative example, the object 802 (i.e., the building 802) may have been changed subsequent to the creation of a 3D model that represents an environment in which the building sits. Based on a determination that the building has changed (based on the comparison of the image data with the 3D model, as in operation 406 of the method 400), the crowd-sourced modeling system 124 guides a plurality of users to a location that corresponds with the 3D model, and presents the AR content 1002 at one or more client devices. Users of the client devices may then capture images of the object 802 simply by viewing the AR content 1002.

According to certain example embodiments, the AR content 1002 may be based on user profile data, as well as based on one or more attributes of the 3D model itself, such as shape, size, and location.

Software Architecture

Figure 11:
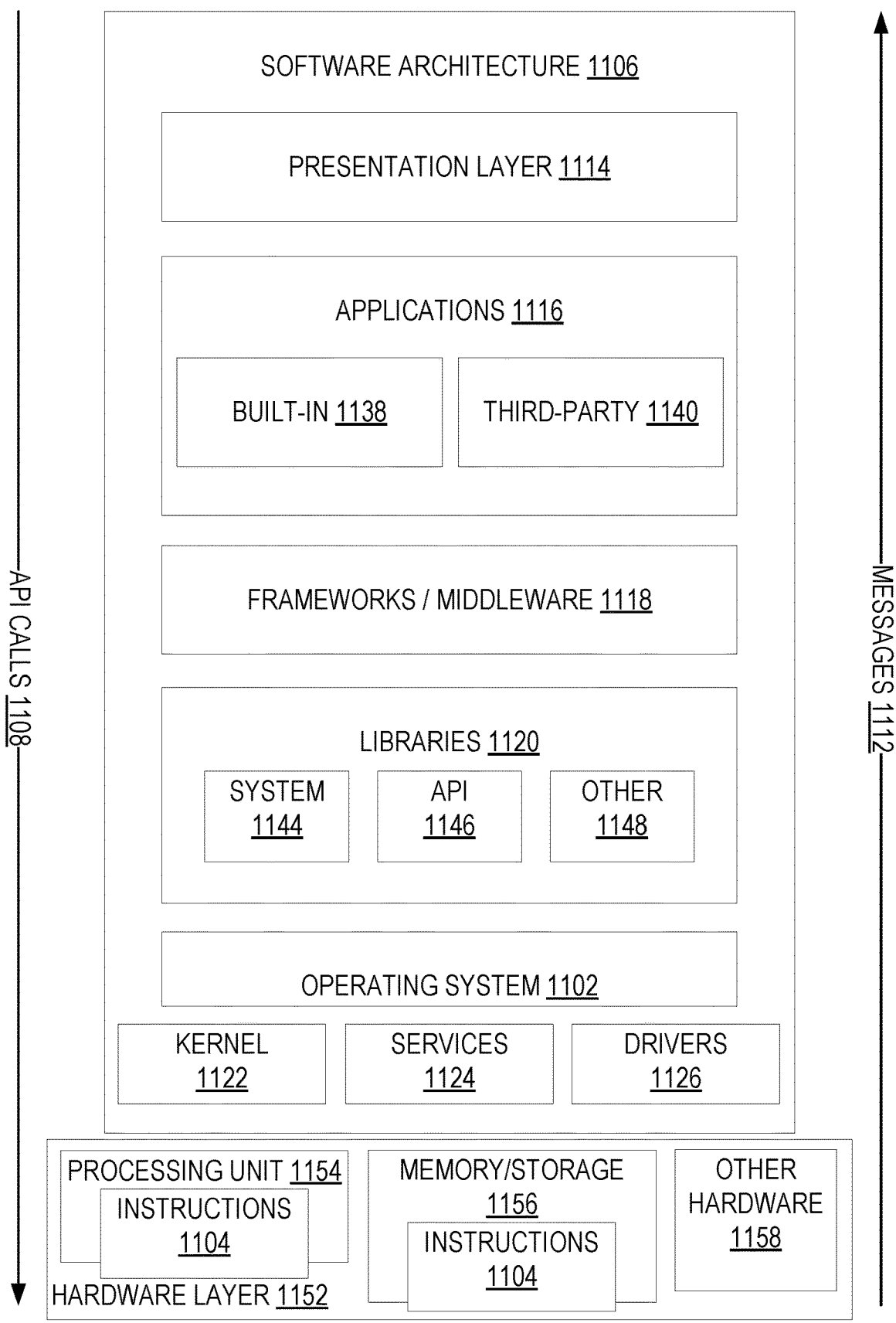
FIG. 11 is a block diagram illustrating a representative software architecture, which may be used in conjunction with various hardware architectures herein described and used to implement various embodiments.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1106 may execute on hardware such as the machine 1200 of FIG. 12 that includes, among other things, processors 1204, memory 1214, and I/O components 1218. A representative hardware layer 1152 is illustrated and can represent, for example, the machine 1100 of FIG. 11. The representative hardware layer 1152 includes a processing unit 1154 having associated executable instructions 1104. Executable instructions 1104 represent the executable instructions of the software architecture 1106, including implementation of the methods, components and so forth described herein. The hardware layer 1152 also includes memory and/or storage modules memory/storage 1156, which also have executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, applications 1116 and a presentation layer 1114. Operationally, the applications 1116 and/or other components within the layers may invoke application programming interface (API) API calls 1108 through the software stack and receive a response as in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124 and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124 and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1140 may invoke the API calls 1108 provided by the mobile operating system (such as operating system 1102) to facilitate functionality described herein.

The applications 1116 may use built in operating system functions (e.g., kernel 1122, services 1124 and/or drivers 1126), libraries 1120, and frameworks/middleware 1118 to create user interfaces to interact with users of the system. Alternatively, or additionally, in some systems interactions with a user may occur through a presentation layer, such as presentation layer 1114. In these systems, the application/component "logic" can be separated from the aspects of the application/component that interact with a user.

Figure 12:
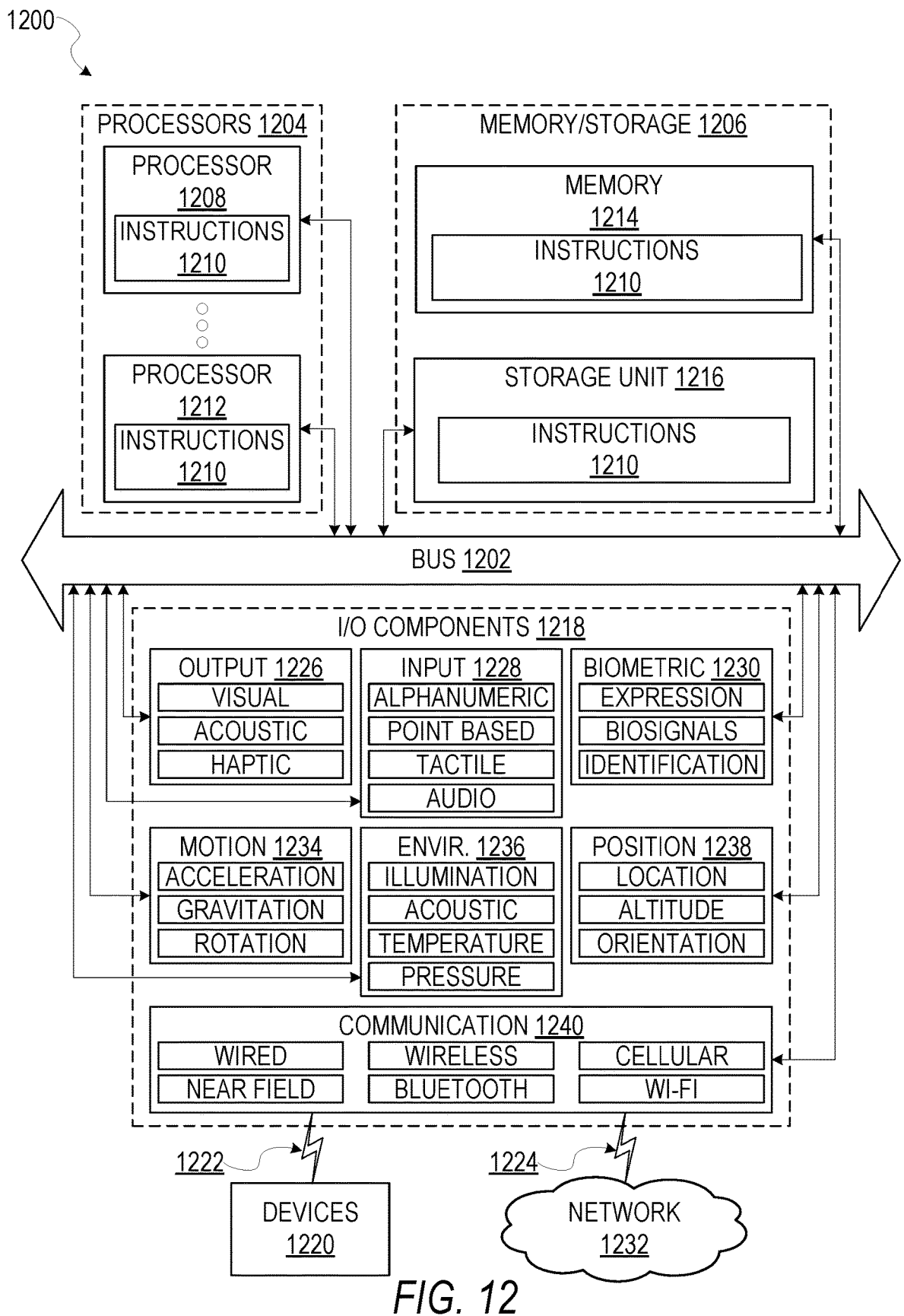
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental environment components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environment components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1222 and coupling 1224 respectively. For example, the communication components 1240 may include a network interface component or other suitable device to interface with the network 1232. In further examples, communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1220 may be another machine or any of a wide variety of peripheral devices (e.g., a peripheral device coupled via a Universal Serial Bus (USB)).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1× RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UNITS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RANI), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
   detecting a change to an environment based on a comparison of image data with a three-dimensional (3D) model associated with the environment, the environment corresponding with a location;
   identifying a client device within a threshold distance of the location associated with the environment responsive to the change to the environment;
   presenting a guide at the client device, the guide comprising at least a display of an augmented-reality guidance element within a presentation of an image at the client device, the augmented-reality guidance element directing a user of the client device to the location;
   detecting the client device at the location;
   accessing image data at the client device based on the detecting the client device at the location, the image data comprising image attributes; and
   generating a portion of a 3D model based on the image attributes of the image data.

2. The method of claim 1, wherein the accessing the image data at the client device includes:
   accessing a repository that comprises a collection of image data associated with the location, the collection of image data including at least the image data.

3. The method of claim 1, wherein the accessing image data at the client device based on the detecting the client device at the location includes:
   causing display of a request for the image data at the client device in response to the detecting the client device at the location; and
   receiving the image data at the client device.

4. The method of claim 1, wherein the detecting the client device within the threshold distance of the location includes:
   detecting a change in an environment that corresponds with the location; and
   identifying the client device within the threshold distance of the location in response to the detecting the change in the environment.

5. The method of claim 1, wherein the 3D model includes a 3D mesh model that depicts a surface feature of the location.

6. The method of claim 1, wherein the accessing the image data at the client device based on the detecting the client device at the location includes:

selecting the image data based on the image attributes of the image data, the image attributes including image metadata.

7. A system comprising:

a memory; and at least one hardware processor coupled to the memory and comprising instructions that causes the system to perform operations comprising:

detecting a change to an environment based on a comparison of image data with a three-dimensional (3D) model associated with the environment, the environment corresponding with a location;

identifying a client device within a threshold distance of the location associated with the environment responsive to the change to the environment;

presenting a guide at the client device, the guide comprising at least a display of an augmented-reality guidance element within a presentation of an image at the client device, the augmented-reality guidance element directing a user of the client device to the location;

detecting the client device at the location;

accessing image data at the client device based on the detecting the client device at the location, the image data comprising image attributes; and generating a portion of a 3D model based on the image attributes of the image data.

8. The system of claim 7, wherein the accessing the image data at the client device includes:

accessing a repository that comprises a collection of image data associated with the location, the collection of image data including at least the image data.

9. The system of claim 7, wherein the accessing image data at the client device based on the detecting the client device at the location includes:

causing display of a request for the image data at the client device in response to the detecting the client device at the location; and receiving the image data at the client device.

10. The system of claim 7, wherein the detecting the client device within the threshold distance of the location includes:

detecting a change in an environment that corresponds with the location; and identifying the client device within the threshold distance of the location in response to the detecting the change in the environment.

11. The system of claim 7, wherein the 3D model includes a 3D mesh model that depicts a surface feature of the location.

12. The system of claim 7, wherein the accessing the image data at the client device based on the detecting the client device at the location includes:

selecting the image data based on the image attributes of the image data, the image attributes including image metadata.

13. A non-transitory machine-readable storage medium comprising instructions that, when executed by one or more processors of a machine, cause the machine to perform operations comprising:

detecting a change to an environment based on a comparison of image data with a three-dimensional (3D) model associated with the environment, the environment corresponding with a location;

identifying a client device within a threshold distance of the location associated with the environment responsive to the change to the environment;

presenting a guide at the client device, the guide comprising at least a display of an augmented-reality guidance element within a presentation of an image at the client device, the augmented-reality guidance element directing a user of the client device to the location;

detecting the client device at the location;

accessing image data at the client device based on the detecting the client device at the location, the image data comprising image attributes; and generating a portion of a 3D model based on the image attributes of the image data.

14. The non-transitory machine-readable storage medium of claim 13, wherein the accessing the image data at the client device includes:

accessing a repository that comprises a collection of image data associated with the location, the collection of image data including at least the image data.

15. The non-transitory machine-readable storage medium of claim 13, wherein the accessing image data at the client device based on the detecting the client device at the location includes:

causing display of a request for the image data at the client device in response to the detecting the client device at the location; and receiving the image data at the client device.

16. The non-transitory machine-readable storage medium of claim 13, wherein the detecting the client device within the threshold distance of the location includes:

detecting a change in an environment that corresponds with the location; and identifying the client device within the threshold distance of the location in response to the detecting the change in the environment.

17. The non-transitory machine-readable storage medium of claim 13, wherein the 3D model includes a 3D mesh model that depicts a surface feature of the location.

* * * * *